L. S. HACKNEY.
VEHICLE GUIDING MEANS.
APPLICATION FILED AUG. 9, 1907.

899,253.

Patented Sept. 22, 1908.

WITNESSES

INVENTOR
LESLIE S. HACKNEY
BY
HIS ATTORNEYS

UNITED STATES PATENT OFFICE.

LESLIE S. HACKNEY, OF ST. PAUL, MINNESOTA.

VEHICLE-GUIDING MEANS.

No. 899,253.

Specification of Letters Patent.

Patented Sept. 22, 1908.

Application filed August 9, 1907. Serial No. 387,771.

*To all whom it may concern:*

Be it known that I, LESLIE S. HACKNEY, of St. Paul, Ramsey county, Minnesota, have invented certain new and useful Improvements in Vehicle-Guiding Means, of which the following is a specification.

The object of my invention is to provide means for guiding a vehicle on a track or elevated roadway and designed particularly for use with automobiles, for guiding them on a track over which they may be driven regardless of weather conditions or the state of the road.

The invention consists generally in various constructions and combinations, all as hereinafter described and particularly pointed out in the claims.

Figure 1:
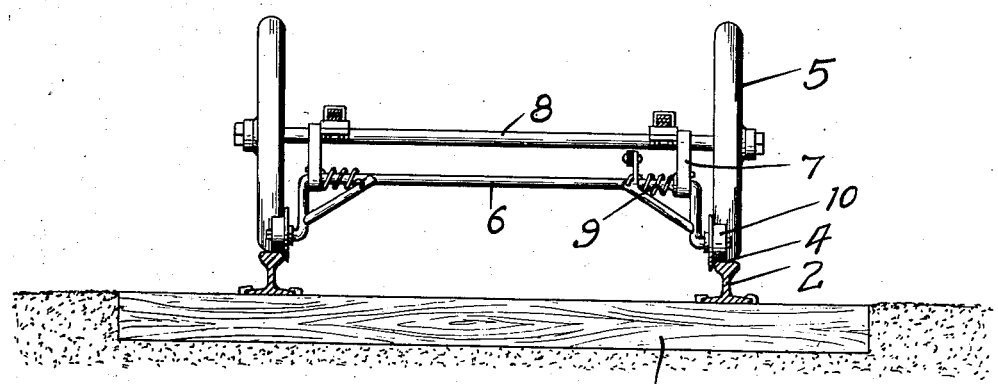
Figure 2:
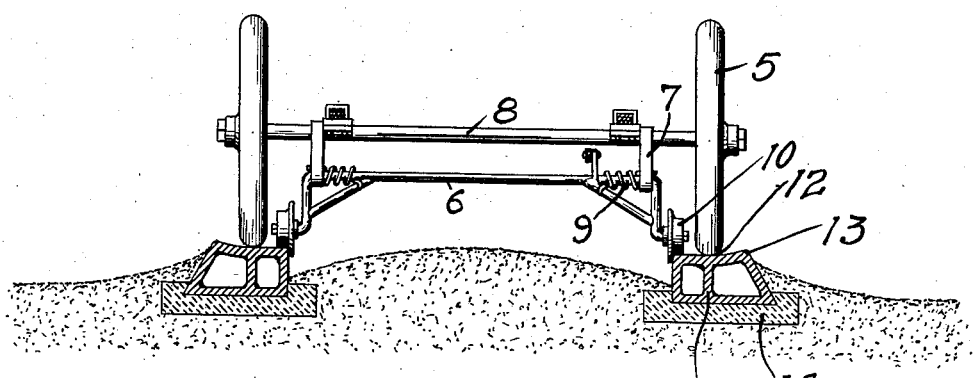
Figure 3:
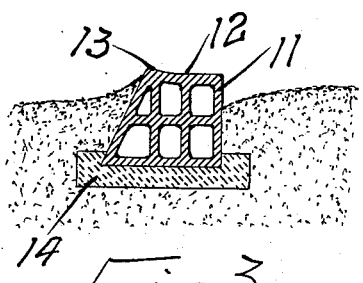

In the accompanying drawings, forming part of this specification, Figure 1 is a transverse sectional view of an automobile track showing my improved guiding device in use thereon. Fig. 2 is a similar view illustrating a modified construction of the track. Fig. 3 is a detail sectional view showing a modification in the construction of the track or tread for the wheel.

In the drawing, 2 represents the track rails secured to ties 3 and having flat surfaces 4 on which the wheels 5 of the automobile are adapted to run. These wheels have the usual pneumatic tires.

6 is a yoke supported upon hangers 7 which depend from the axle 8, and springs 9 mounted on said yoke and arranged to bear on the hangers 7 tend to hold the ends of the yoke in a depressed position and the flanged wheels 10 mounted on said ends in contact with the top of the rails. Flanges on the wheels prevent the automobile wheels from running off the track. The springs 9 will allow the yoke to yield and the wheels 10 to adapt themselves to inequalities in the track. As indicated in Fig. 1 the guiding wheels will run in the rear of the car wheels and it will be impossible for the car wheels to run off the track on curves or at any other point. The yoke 6 is adapted to swing upwardly against the tension of the springs 9 for the purpose of raising the flanged wheels off the track. This raising of the yoke will be accomplished by a suitable lever mechanism which I have not thought necessary to illustrate in this case.

I do not wish to be confined to the manner shown, of mounting the guiding wheels and supporting them from the frame of the vehicle, as various ways may be devised for suspending these guiding wheels and permitting them to operate in a substantially vertical plane with their flanges in contact with the inner faces of the rails.

In Fig. 2 I have shown a modified form of rail consisting of tile blocks 11 having flat upper bearing surfaces 12 for the wheels and raised outer edges 13. Concrete blocks 14 are placed in the roadway and in which the blocks 11 are mounted. The blocks 11 have square inner faces for the flanged wheels 10 which roll on the inner corners of the blocks and prevent the automobile or vehicle wheels from running off the block surface. The normal tread of the wheels will be along the middle line of the blocks.

In Fig. 3 I have illustrated a similar form of block except that double horizontal rows of air spaces are provided making the block considerably higher than the one shown in Fig. 2. This upper or tread surface for the wheels and the edge on which the guide wheels travel correspond substantially to those above described. These blocks will be made of suitable length and united at the ends to form a continuous track.

I have shown this track or roadway for use particularly with an automobile, but do not wish to confine myself to such use as it may be employed as a track for vehicles of all kinds having suitable wheels and for trolley or traction cars.

I claim as my invention:

1. A vehicle track having an upper or tread surface to receive the vehicle or car wheels, a yoke mounted on the frame of the vehicle and having arms yieldingly held toward said track, wheels mounted on said arms and having flat treads adapted to rest and normally travel on the top of said track, said wheels having flanges on one side arranged to extend down beside the rails and contact with the inner faces thereof, whereby the vehicle wheels will be held on the track and said flanged wheels revolving in planes parallel substantially with the plane of the vehicle wheels, substantially as described.

2. The combination, with a frame having carrying wheels and hangers depending therefrom, of a yoke extending transversely of said frame and journaled near its ends in said hangers and provided with depending arms and flanged guiding wheels mounted on said arms and operating in vertical planes parallel substantially with the planes of said carrying wheels, and means for yieldingly holding said flanged wheels in a depressed position.

3. The combination, with a frame having carrying wheels, of a yoke journaled on said frame and extending from side to side thereof, and means for yieldingly holding said yoke in a depressed position, guiding wheels carried by said yoke and having flat tread surfaces and rails arranged to receive said flat surfaces and said wheels having depending flanges arranged to bear on the inner faces of said rails and said wheels operating in vertical planes, substantially as described.

In witness whereof, I have hereunto set my hand this 29th day of July 1907.

LESLIE S. HACKNEY.

Witnesses:
RICHARD PAUL,
J. B. ERA.